June 17, 1930.  A. J. SALAZAR  1,764,121
VEHICLE SIGNAL
Filed April 17, 1929
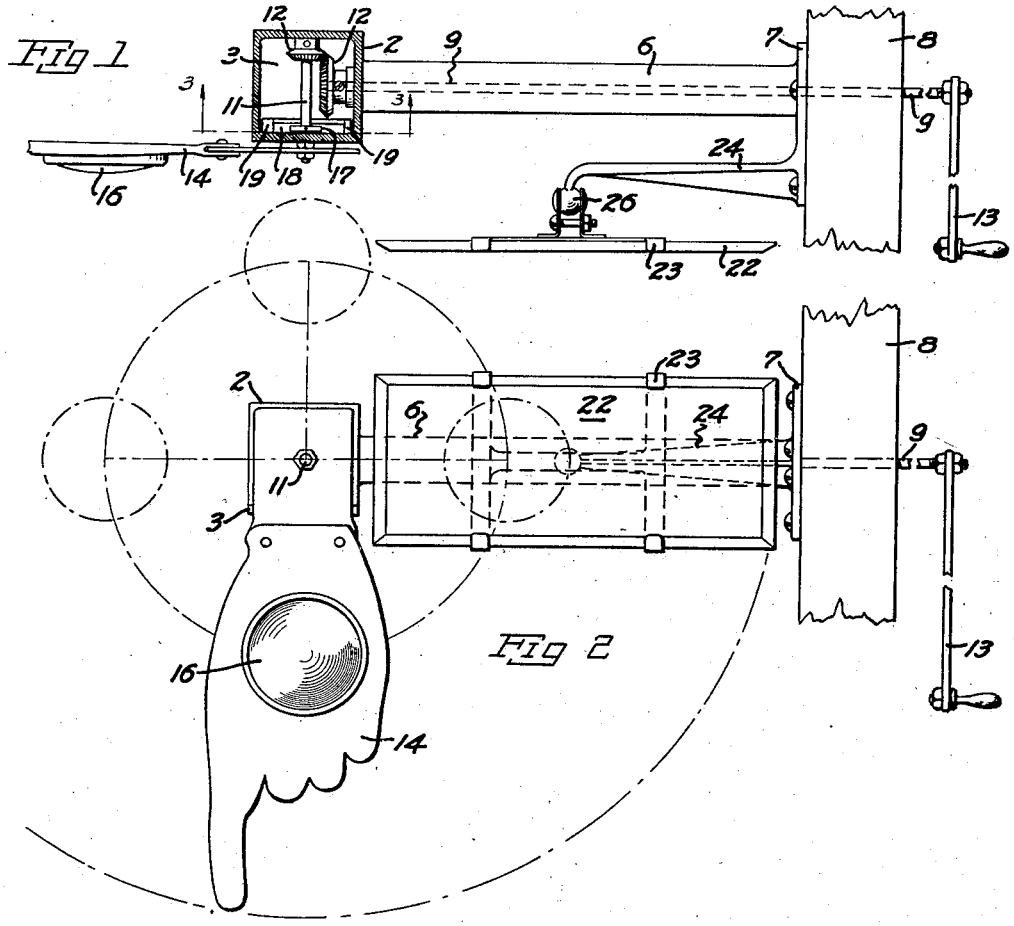
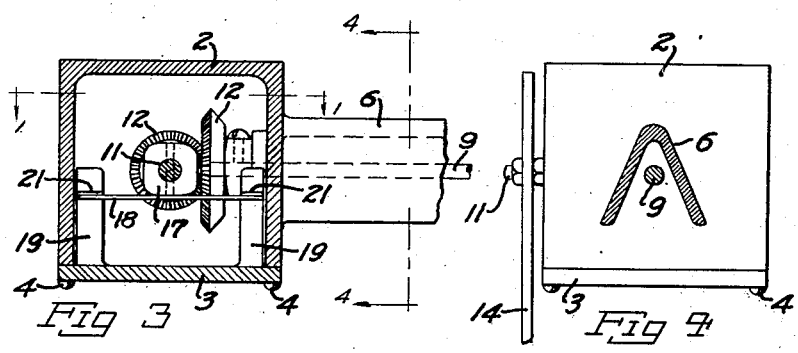
INVENTOR
ANTONIO J. SALAZAR
BY Charles S. Evans
ATTORNEY Patented June 17, 1930

1,764,121

UNITED STATES PATENT OFFICE

ANTONIO J. SALAZAR, OF SAN FRANCISCO, CALIFORNIA

VEHICLE SIGNAL

Application filed April 17, 1929. Serial No. 355,800.

My invention relates to a vehicle signal, and particularly to one adapted to indicate turning or stopping of the vehicle.

An object of my invention is the provision of a vehicle signal which may be operated from the inside of a vehicle, such as an automobile sedan, when all doors and windows are closed.

Another object of my invention is the provision, in a vehicle signal of the character described, of a movable signal element and means for arresting the movement of the element at predetermined points, so that the operator may know when the signal element is in proper position.

A further object of my invention is the provision of a vehicle signal which may be manufactured economically, and which is of simple construction.

My invention possesses other objects and valuable features, some of which will be set forth in the following description of my invention which is illustrated in the drawings forming part of the specification. It is to be understood that I do not limit myself to the showing made by the said description and drawings, as I may adopt varying forms of my invention within the scope of the claims.

Referring to the drawings:

Figure 1 is a top elevation of a vehicle signal embodying my invention, and illustrating the signal attached to a portion of a vehicle. Portions of the structure are omitted to shorten the view; and a portion of the housing is shown in section to disclose clearly the construction, the plane of section being indicated by the line 1—1 of Fig. 3.

Figure 2 is a side elevational view of the vehicle signal, the various positions which the signal element may assume being indicated in dotted lines.

Figure 3 is a sectional view taken in a plane indicated by the line 3—3 of Fig. 1.

Figure 4 is a sectional view taken in a plane indicated by the line 4—4 of Fig. 3.

In broadly descriptive terms, the vehicle signal of my invention comprises a signal element which is mounted for movement, preferably about an axis. Means are provided for moving the element; and means are also provided for arresting the movement at predetermined points, so that the operator may know when the signal element is in proper position.

In greater detail, the vehicle signal comprises a cubically shaped housing 2, having an open side which is closed by a cover 3 secured thereto by screws 4. The housing is preferably formed integral with the V-shaped, hollow, and elongated bracket 6. The bracket is open at the same side as the housing, thereby making it possible to cast these elements out of metal as a single unit, with minimum cost. Bracket 6 is secured at its base 7 to the operator's side 8 of a vehicle; and it is positioned about a rotatably mounted shaft 9 extending therethrough from the inside of the vehicle into the housing 2.

Journaled in the housing 2 and transverse to the shaft 9 is a shaft 11. Each of the shafts 9 and 11 carries a bevel pinion 12 which mesh with each other. Shaft 9 also carries a handle 13 positioned inside the vehicle, so that this shaft may be conveniently rotated by the operator; and shaft 11 carries a signal element 14 positioned outside the housing. Upon turning of the handle 13 the signal element 14 is caused to rotate about an axis. Preferably, the ratio of pinions 12 is such that a slight movement of handle 13 will cause a greater movement of the signal element 14.

Although any type of signal element may be used, it is preferred to use one simulating a hand, with the index finger pointing outwardly to indicate direction. If desired, the hand may be provided with any conventional or well known means, such as the electric lamp 16, for giving an illuminated signal at night.

Means are provided for arresting the movement of the signal element 14 at predetermined points, so that the operator will know when the element is in the desired or proper indicating position. Mounted for rotation with shaft 11 and positioned adjacent a side wall of the housing is a cam 17 of substantially square shape to form sides, and having rounded corners. The cam abuts against a spring 18 extending transversely across the housing; and the spring is supported on a pair of spaced brackets 19 positioned adjacent the same wall of the housing and mounted on the cover 3. Brackets 19 are formed with apertures 21 adjacent said wall of the housing, and in which spring 18 is positioned. By the described arrangement, the spring 18 may be placed in the bracket apertures before positioning of cover 3 on the housing; and upon securing the cover to the housing, the spring is held in position. If desired, the cover 3 and brackets 19 may be cast as a single unit.

The signal element 14 is fixed in such position on shaft 11, so that when one of the sides of cam 17 rests upon spring 18, the signal element points downwardly, which position is conventional for indicating stopping of the vehicle. When the cam 17 is turned one-quarter revolution in a clockwise direction, with reference to Fig. 3 of the drawing, the signal element points outwardly, the movement thereof being arrested at this point and the signal element being held in this position by the side of the cam 17 resting on spring 18. The outward position of the hand 14 is the conventional signal for left-hand turn. Upon movement of the signal element another quarter of a revolution, it will point and be held upwardly, which position is conventional for indicating a right-hand turn. In non-signalling position, the indicating element 14 may be moved to point inwardly. To cover the signal element from observation when it points inwardly, it is preferred to position a rear view mirror 22 behind it. The mirror may be mounted in any suitable fame 23 supported on the bracket 24, preferably cast integral with bracket 6 to form a unitary construction, which may be economically manufactured. Preferably, the mirror frame 23 is mounted on a universal joint 26 to permit adjustment of the mirror to suit the convenience of the operator.

From the preceding description, it is seen that I have provided a vehicle signal which is not only of simple construction, but is one which may be easily and quickly operated from the inside of the vehicle.

I claim:

1. A vehicle signal comprising a housing having an open side and provided with a cover secured thereto, a pair of spaced brackets mounted on said cover adjacent a wall of said housing, each bracket having an aperture adjacent said wall, a spring mounted in said apertures, a rotatably mounted shaft in said housing, a cam mounted for movement with said shaft and abutting against said spring, said cam having sides, a signal element mounted for movement with said shaft, and means for rotating the shaft to move the signal element.

2. A vehicle signal comprising a housing, a pair of spaced brackets mounted in said housing, each bracket having an aperture therein, a spring mounted in said apertures, a rotatably mounted shaft in said housing, a cam mounted for movement with said shaft and abutting against said spring, said cam having sides, a signal element mounted for movement with said shaft, and means for rotating the shaft to move the signal element.

In testimony whereof, I have hereunto set my hand.

ANTONIO J. SALAZAR.